United States Patent
Asukai

(10) Patent No.: US 12,416,644 B2
(45) Date of Patent: Sep. 16, 2025

(54) LOW-TEMPERATURE STORAGE SYSTEM

(71) Applicant: TSUBAKIMOTO CHAIN CO., Osaka (JP)

(72) Inventor: Masahiro Asukai, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 592 days.

(21) Appl. No.: 17/943,923

(22) Filed: Sep. 13, 2022

(65) Prior Publication Data

US 2023/0003754 A1    Jan. 5, 2023

Related U.S. Application Data

(63) Continuation of application No. PCT/JP2020/047448, filed on Dec. 18, 2020.

(30) Foreign Application Priority Data

Mar. 18, 2020  (JP) .................. 2020-047529

(51) Int. Cl.
*B65G 1/137*    (2006.01)
*G01N 35/04*    (2006.01)

(52) U.S. Cl.
CPC ............. *G01N 35/04* (2013.01); *B65G 1/137* (2013.01)

(58) Field of Classification Search
CPC .................. G01N 35/04; B65G 1/137
See application file for complete search history.

(56) References Cited

FOREIGN PATENT DOCUMENTS

| JP | 2009-42011 A | 2/2009 |
|---|---|---|
| JP | 2015-131260 A | 7/2015 |
| JP | 2016-128339 A | 7/2016 |
| JP | 2016-190706 A | 11/2016 |

OTHER PUBLICATIONS

International Search Report dated Mar. 9, 2021, issued in counterpart International application No. PCT/JP2020/047448, with English translation. (5 pages).
Written Opinion dated Mar. 9, 2021, issued in counterpart International application No. PCT/JP2020/047448. (3 pages).

*Primary Examiner* — Jill A Warden
*Assistant Examiner* — Michael Stanley Gzybowski
(74) *Attorney, Agent, or Firm* — WHDA, LLP

(57) ABSTRACT

To provide a simple-structured low-temperature storage system capable of carrying storage objects to a full capacity on a tray and of reliably transferring storage objects without the necessity for a camera to check the positions of a rack or storage objects. The low-temperature storage system includes a storage area inside a low-temperature storage chamber for storing storage objects, and a picking area where a positioning device is disposed to allow storage objects to be carried in and out. The positioning device includes a rack fixing unit that fixes a rack, a tray fixing unit, and a drive mechanism. The rack fixing unit includes a rack pressing member that presses the rack, and a rack motion restricting member that restricts movements of the rack. The tray fixing unit includes a tray pressing member that presses the tray, and a tray motion restricting member that restricts movements of the tray.

8 Claims, 6 Drawing Sheets

LOW-TEMPERATURE STORAGE SYSTEM

BACKGROUND OF THE INVENTION

1. Field of the Invention

The present invention relates to a positioning device for a low-temperature storage system that stores storage objects at low temperatures, and more particularly to a low-temperature storage system that stores samples for drug development used in the processes of discovering or designing drugs in medical science, bioengineering, and pharmaceutical sciences.

2. Description of the Related Art

Low-temperature storage systems are commonly known and used for storing samples for drug development used in the processes of discovering or designing drugs in medical science, bioengineering, and pharmaceutical sciences. Tubes containing samples are held in storage racks, which are stored inside a low-temperature storage chamber that is kept under low temperatures such as −150° C. obtained by use of liquid nitrogen injected into the chamber.

For example, Japanese Patent Application Publication No. 2016-190706 describes a low-temperature storage system 10 having a storage area and a picking area 22 inside a low-temperature storage chamber 20. Racks (storage racks R) capable of holding a plurality of storage objects (tubes C) are carried on trays (storage trays) and stored in the storage area of the chamber, and storage objects (tubes C) held on a storage rack R are transferred onto another storage rack R in the picking area 22 inside the low-temperature storage chamber 20.

In the low-temperature storage system 10 described in Japanese Patent Application Publication No. 2016-190706, a picking tray 23 is disposed in the picking area 22. On the picking tray 23 are provided a first rack stage 30A for holding a rack (storage rack R) from which objects are transferred, and a second rack stage 30B for holding a rack (storage rack R) to which objects are transferred. The storage rack R held on the first rack stage 30A is prevented from moving upward during transfer of storage objects (tubes C) by an elevation preventing stopper (anti-elevation mechanism 40) slidable along a horizontal, longitudinal direction. This prevents the issue of accidental elevation of a rack (storage rack R) caused by a storage object (tube C) getting stuck on the rack when the storage object (tube C) is picked up.

The elevation preventing stopper (anti-elevation mechanism 40) is driven by a drive mechanism (drive member). The drive mechanism (drive member) is driven by a power source outside the low-temperature storage chamber. Therefore, malfunctioning of the power source resulting from the low-temperature environment is avoided to ensure favorable operations of the elevation preventing stopper (anti-elevation mechanism 40). Moreover, an unwanted temperature rise inside the low-temperature storage chamber caused by the heat generated by the power source is prevented, and a wider space can be made available inside the low-temperature storage chamber for the storage area of the racks (storage racks R).

SUMMARY OF THE INVENTION

The low-temperature storage system known from Japanese Patent Application Publication No. 2016-190706 still has some scope of improvement.

Namely, in the low-temperature storage system described in Japanese Patent Application Publication No. 2016-190706, while each rack is set to a more or less fixed position by means of a guide, there is some play between the guide and the rack. A camera or the like could be used to precisely determine the positions of a rack or a storage object when transferring storage objects between racks. However, it would necessitate a picking unit of a special design that is able to enter the low-temperature storage chamber without passing part of the opening of the chamber so as not to interfere with the camera disposed above the opening or the imaging area of the camera. Such a picking unit would increase complexity of the machine structure.

Moreover, unwanted entrance of humid air from the opening into the low-temperature storage chamber may create a fog inside the low-temperature storage chamber, and make the operation of checking the position of a rack or storage object with a camera difficult, or cause malfunctioning.

Moreover, position recognition of a rack or storage object based on an image captured by a camera would require fine adjustments for each different type of racks or storage objects and make the operation process more complex.

Position recognition using a camera may not be necessary if a rack for storage and a rack for carrying in and out storage objects are set precisely at specified positions for picking operations. On the other hand, such a configuration causes an issue that storage objects being held on racks cannot be carried to a full capacity on a tray because the tray and rack have different shapes.

The present invention solves these problems and aims at providing a simple-structured low-temperature storage system capable of carrying storage objects to a full capacity on a tray and of reliably transferring storage objects without the necessity for a camera to check the positions of a rack or storage objects.

The present invention solves the above problem by providing a low-temperature storage system including a storage area inside a low-temperature storage chamber where a plurality of storage objects are held on a tray and stored, and a picking area inside the low-temperature storage chamber where a positioning device is disposed for setting a tray at a fixed position to allow storage objects to be carried in and out, the positioning device including a rack fixing unit for setting a rack, which is for transferring and carrying in and out storage objects, at a fixed position, a tray fixing unit for setting a tray at a fixed position, and a drive mechanism for driving the rack fixing unit and the tray fixing unit. The rack fixing unit includes a rack pressing member driven by the drive mechanism to press a rack in a predetermined direction, and a rack motion restricting member that restricts movements of the rack being pushed by the rack pressing member. The tray fixing unit includes a tray pressing member driven by the drive mechanism to press a tray in a predetermined direction, and a tray motion restricting member that restricts movements of the tray being pushed by the tray pressing member.

The positioning device in the low-temperature storage system of the present invention according to claim 1 includes a rack fixing unit, a tray fixing unit, and a drive mechanism. The rack fixing unit includes a rack pressing member that presses the rack, and a rack motion restricting member that restricts movements of the rack. The tray fixing unit includes a tray pressing member that presses the tray in a predetermined direction, and a tray motion restricting member that restricts movements of the tray. Therefore, the rack and tray are respectively pressed by the rack pressing member and tray pressing member toward the rack motion restricting member and tray motion restricting member, whereby the rack and tray placed in the picking area can reliably be brought to and set fixedly at specified positions. Namely, storage objects on a rack or tray that is set fixedly at a predetermined position can be readily transferred from one to another based only on previously stored data of specific positions, and there is no need to check the positions of the storage objects on a rack or tray using a camera.

This obviates the need to consider how to secure space above an opening inside the low-temperature storage chamber, or how to avoid interference between the imaging area and other components, which would be necessary with the use of a camera, and therefore helps avoid increases in complexity or size of the machine structure.

According to the configuration set forth in claim 2, the tray fixing unit is provided with a tray motion limiting member that holds a tray at a predetermined position with some play. There is no need for fine position alignment when a tray is placed on the tray fixing unit. Even if the tray placed on the tray fixing unit is displaced by an impact or the like before pressed by the tray pressing member, the tray being pressed by the tray pressing member can still be positioned at a specified position since the tray displacement is kept minimal.

According to the configuration set forth in claim 3, the drive mechanism includes a linking member causing the tray pressing member and the rack pressing member to move back and forth in respective pressing directions, and a power transmission lever connected to and causing the linking member to move back and forth. Thus the tray pressing member and rack pressing member are both moved back and forth via the linking member by operating the power transmission lever alone.

The tray pressing member and rack pressing member can be moved back and forth easily by disposing the power transmission lever at a position where it can readily relay a drive force.

According to the configuration set forth in claim 4, the linking member includes a tray-side linking member and a rack-side linking member. One of the tray-side linking member and the rack-side linking member is connected to a lever connecting rod of the power transmission lever. One end of the lever connecting rod extends to a position where the one end is able to make contact with one of the tray-side linking member and the rack-side linking member that is not connected to the lever connecting rod. This allows the timing of transmitting a drive force to the tray-side linking member and rack-side linking member to be varied, which in turn enables the timing of pressing the tray and rack, or the amount of applied pressing force, to be varied, for example, or allows other operations such as pressing only one of the tray and rack while replacing the other.

According to the configuration set forth in claim 5, the drive lever is configured to be operable by an external force applied from outside the low-temperature storage chamber, and therefore a power source that generates a drive force for operating the drive lever can be disposed outside the low-temperature storage chamber. The drive lever can therefore be operated without letting the heat generated from the power source enter the low-temperature storage chamber so that a temperature rise inside the low-temperature storage chamber during the operation can be minimized.

According to the configuration set forth in claim 6, the linking member includes a biasing member biasing at least one of the tray pressing member and the rack pressing member to an opposite direction from the pressing direction. Even if the drive lever applies an excessive drive force to the linking member, the biasing member can mitigate the speed of the linking member traveling in the pressing direction.

This prevents excessive pressing of the tray and rack by the tray pressing member and rack pressing member, and reduces stress on various components.

When the supply of drive force to the drive lever is stopped to free the tray and rack from the pressure, the biasing force of the biasing member causes the linking member to automatically return to its original position before it pressed the tray and rack.

In the case where the rack-side linking member is not provided with a biasing member and instead connected to the lever connecting rod, while the tray-side linking member is provided with the biasing member and configured to be able to contact the lever connecting rod, the tray-side linking member pushes back the lever connecting rod connected to the rack-side linking member when automatically returning to the original position before it pressed the tray by the biasing force of the biasing member, so that the rack-side linking member can also be returned to its original position before it pressed the rack.

According to the configuration set forth in claim 7, the rack pressing member further includes a slide plate and an auxiliary linking member. A force-transmitting member is provided underneath the slide plate. A force-transmitting boss is provided at a distal end of a force-transmitting base part extending from a rack-side rotating member of the auxiliary linking member. A pressing piece is provided to a distal end of a force-applying base part of the auxiliary linking member. The force-transmitting member is disposed such as to be able to press the force-transmitting boss. Therefore, as the slide plate moves back and forth, the force-transmitting boss is pressed by the force-transmitting member and rotates the rack-side rotating member, and causes the pressing piece to press the rack.

This way, the rack can be pressed in the direction in which the slide plate moves back and forth and in the direction perpendicular to the moving direction of the slide plate, only by pressing the slide plate.

According to the configuration set forth in claim 8, the rack fixing unit is provided with an elevation preventing stopper movable back and forth over a rack set at a fixed position on the rack fixing unit. In the event of a storage object getting stuck on the rack when the storage object is picked up, the elevation preventing stopper holds down the rack so that the storage object alone is reliably picked up.

DESCRIPTION OF THE PREFERRED EMBODIMENT

Figure 1:
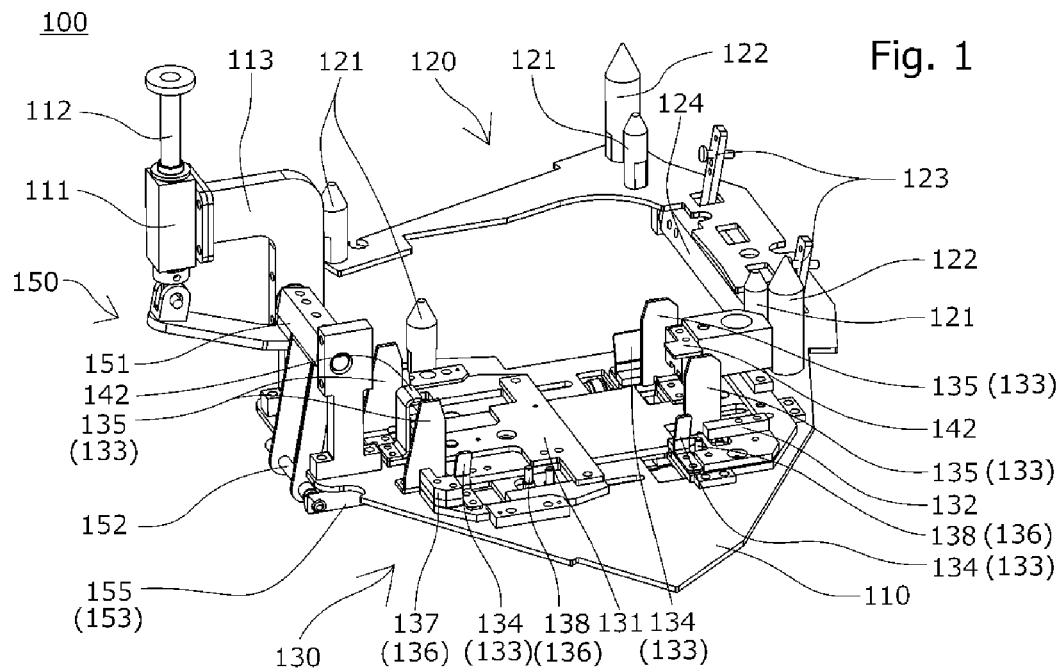
FIG. 1 is a perspective view illustrating a positioning device 100 of a low-temperature storage system according to one embodiment of the present invention.
Figure 2:
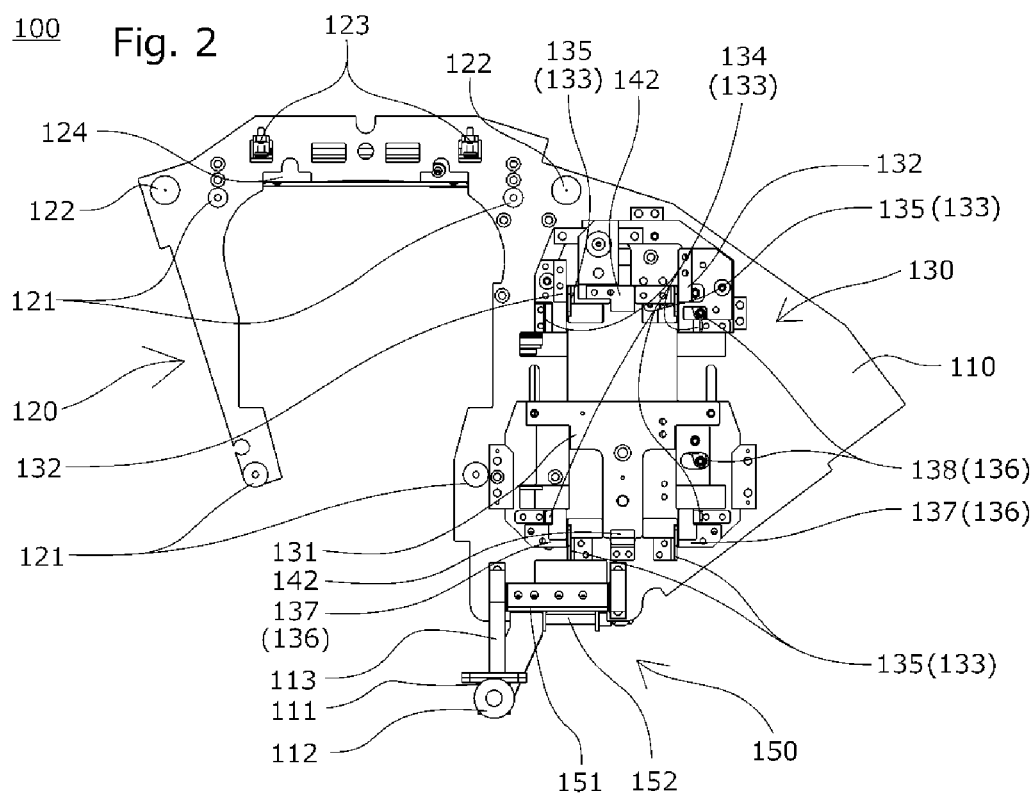
FIG. 2 is a top plan view illustrating the positioning device 100 of the low-temperature storage system according to one embodiment of the present invention.
Figure 3:
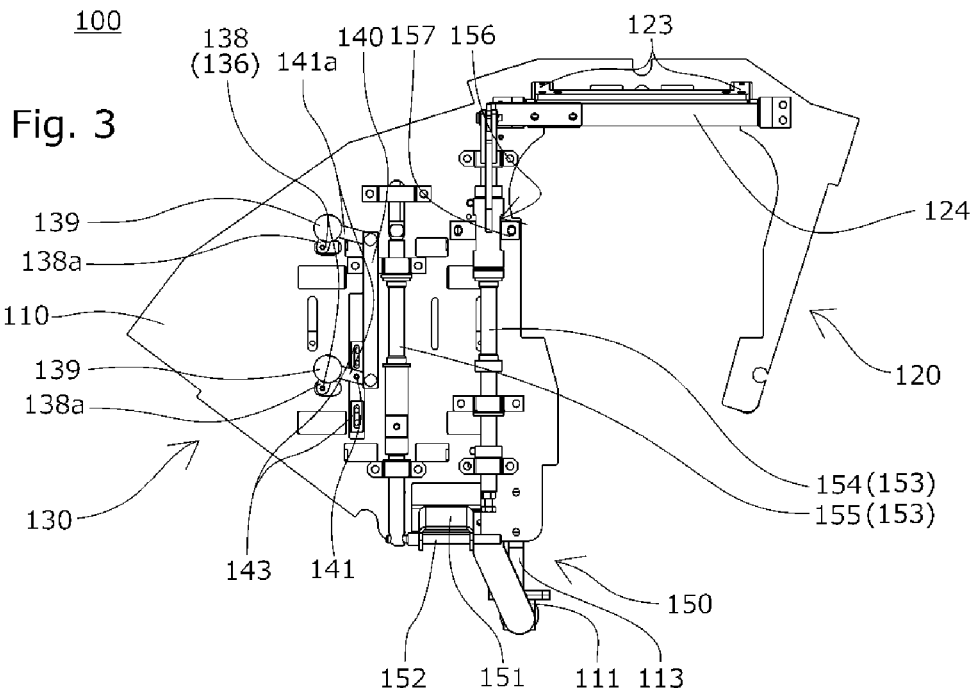
FIG. 3 is a bottom plan view illustrating the positioning device 100 of the low-temperature storage system according to one embodiment of the present invention.
Figure 4:
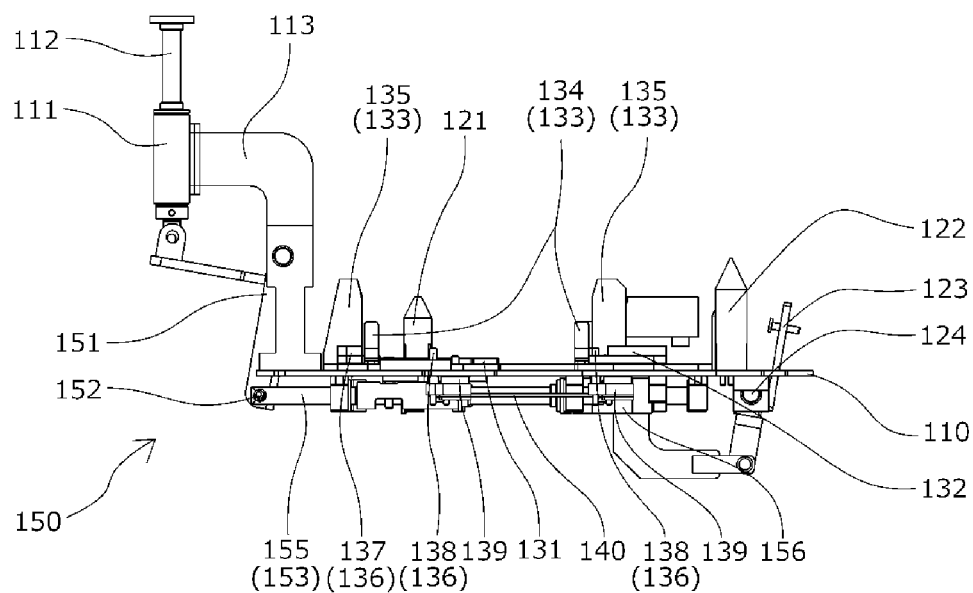
FIG. 4 is a side view illustrating the positioning device 100 of the low-temperature storage system according to one embodiment of the present invention.

A positioning device 100 of a low-temperature storage system according to one embodiment of the present invention is described below with reference to the drawings.

For ease of explanation, only a picking area is illustrated and other components of the low-temperature storage chamber than those of the picking area, and the picking device, are not illustrated.

The low-temperature storage system in which the positioning device 100 that is one embodiment of the present invention is provided includes, as illustrated in FIG. 1 to FIG. 4, a storage area (not shown) inside a low-temperature storage chamber (not shown), where a plurality of storage objects C are held on trays T and stored, and a picking area inside the low-temperature storage chamber (not shown) where the positioning device 100 is disposed for fixedly setting a tray T to allow storage objects C to be carried in and out. On a base plate 110 of the positioning device 100, there are provided a support arm 113, a vertically extending tubular slide support 111 at the distal end of the support arm 113, and a drive shaft 112 slidably passing through the slide support 111.

On the base plate 110 are also provided a rack fixing unit 130 for setting a rack R, which is for transferring and carrying in and out storage objects C, at a fixed position, a tray fixing unit 120 for setting a tray T at a fixed position, and a drive mechanism 150 for driving the rack fixing unit 130 and tray fixing unit 120.

The rack fixing unit 130 includes a slide plate 131 movable in a direction in which it is pressed, with a rack R placed thereon, a rack motion limiting member 133 that limits movements of the rack R placed on the slide plate 131 while allowing slight displacement, a rack pressing member 136 that pushes the rack R, and rack motion restricting members 132 that restrict movements of the rack R being pushed.

The slide plate 131 is connected to a rack-side linking member 155 of the drive mechanism 150 to be described later. The slide plate 131 is provided with short-side pressing pieces 137 of the rack pressing member 136 for pushing the rack R on its shorter side, and force-transmitting members 143 that move back and forth a force-transmitting boss 141 to be described later.

An elevation preventing stopper 142 is provided at the midpoint of the short-side pressing piece 137.

An elevation preventing stopper 142 is provided also on the opposite short side across the rack R placed on the slide plate 131, at a fixed position on the base plate 110.

The rack motion restricting members 132 each are disposed opposite the short-side pressing pieces 137 across the rack R placed on the slide plate 131.

The rack motion limiting member 133 includes long-side motion limiting parts 134 that limit the displacement of the rack R on the long side, and short-side motion limiting parts 135 that limit the displacement of the rack R on the short side. The short-side motion limiting parts 135 located on the same side as the rack motion restricting members 132 are configured to be movable back and forth in coordination with the movements of the slide plate 131.

The rack pressing member 136 includes two long-side pressing pieces 138 that press the rack R from a long side. The two long-side pressing pieces 138 are each connected to each of two rack-side rotating members 139 via a force-applying base part 138a. The two rack-side rotating members 139 are coupled together via an auxiliary linking member 140.

The auxiliary linking member 140 is connected to the rack-side rotating members 139 via force-transmitting base parts 141a. The force-transmitting boss 141 is provided to the force-transmitting base part 141a of one of the rack-side rotating members 139. The force-transmitting boss 141 being pressed by the force-transmitting members 143 rotates both of the two rack-side rotating members 139 via the auxiliary linking member 140.

This rotation of the rack-side rotating members 139 translates into the back and forth movements of the long-side pressing pieces 138.

The tray fixing unit 120 includes a tray pressing member 123 that presses the tray T, tray motion limiting members 122 that limit movements of the tray T placed on the tray fixing unit 120 while allowing slight displacement, and tray motion restricting members 121 that restrict movements of the tray T being pushed.

The tray pressing member 123 is configured to receive a force for pressing the tray T transmitted from a tray-side linking member 154 to be described later via a tray-side rotating member 124.

The drive mechanism 150 includes a power transmission lever 151 connected to the drive shaft 112, a linking member 153 made up of the tray-side linking member 154 and rack-side linking member 155 respectively supplying a drive force to the tray pressing member 123 and rack pressing member 136, and a lever connecting rod 152 connecting the power transmission lever 151 and the rack-side linking member 155.

The tray-side linking member 154 has a chamfer 156, and a movement adjustment stopper 157 is provided on the lower surface of the base plate 110 at a position where it fits into the space made by the chamfer 156.

Next, the positioning of a tray T and a rack R by the positioning device 100 of the low-temperature storage system according to one embodiment of the present invention is described below step by step with reference to FIG. 5 to FIG. 11.

Figure 5:
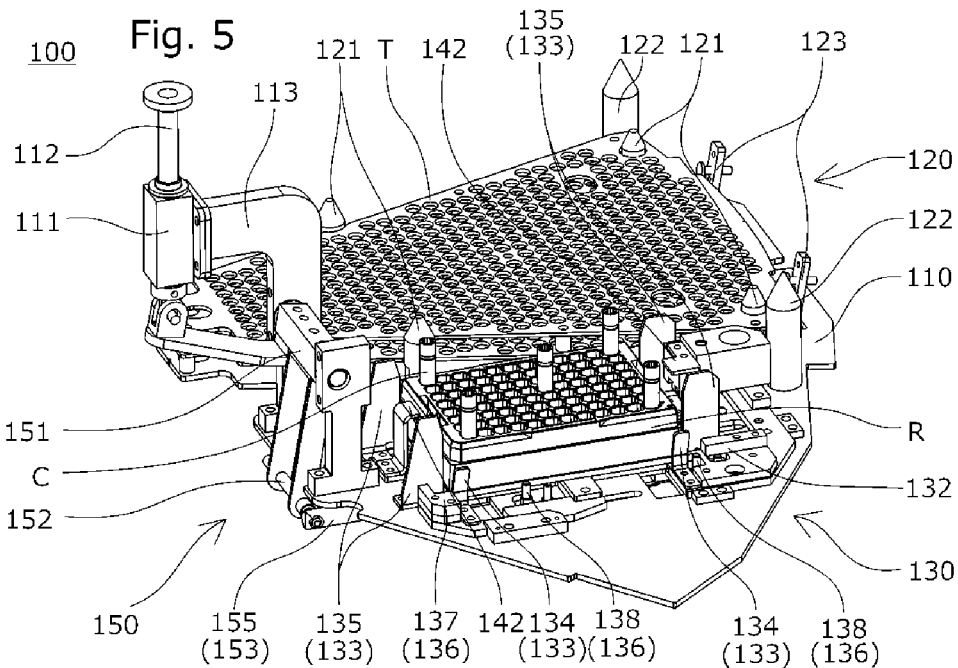
FIG. 5 is a perspective view illustrating the positioning device 100 of the low-temperature storage system according to one embodiment of the present invention with a tray T and a rack R being placed thereon.
Figure 6:
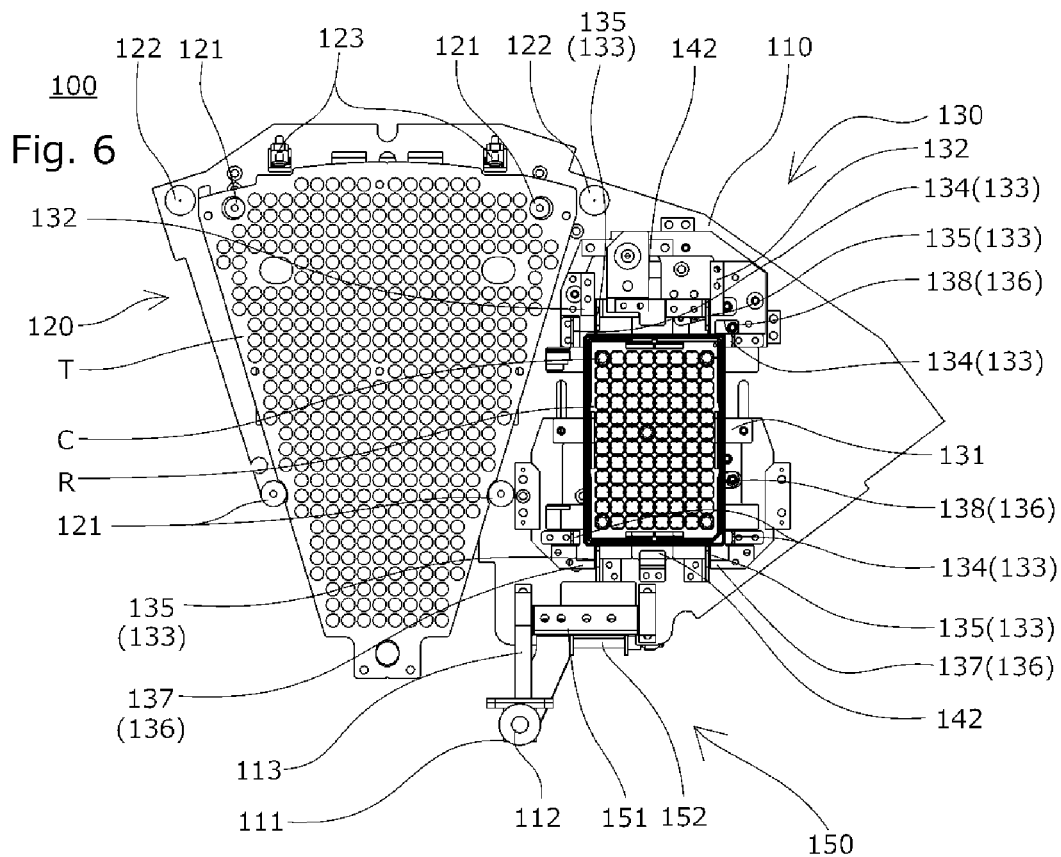
FIG. 6 is a top plan view illustrating the positioning device 100 of the low-temperature storage system according to one embodiment of the present invention with a tray T and a rack R being placed thereon.
Figure 7:
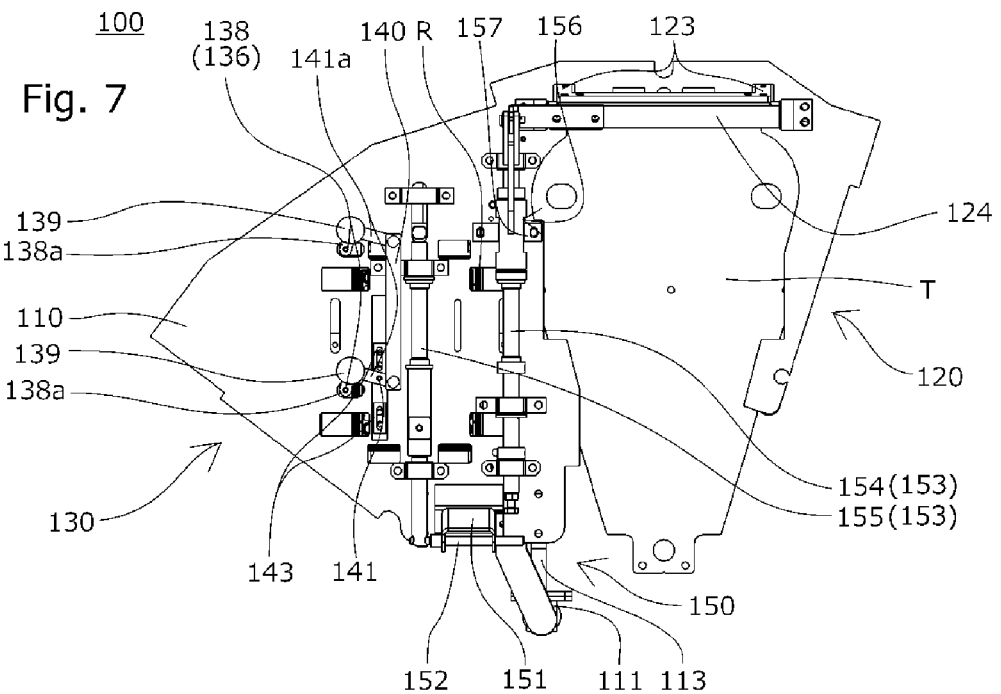
FIG. 7 is a bottom plan view illustrating the positioning device 100 of the low-temperature storage system according to one embodiment of the present invention with a tray T and a rack R being placed thereon.
Figure 8:
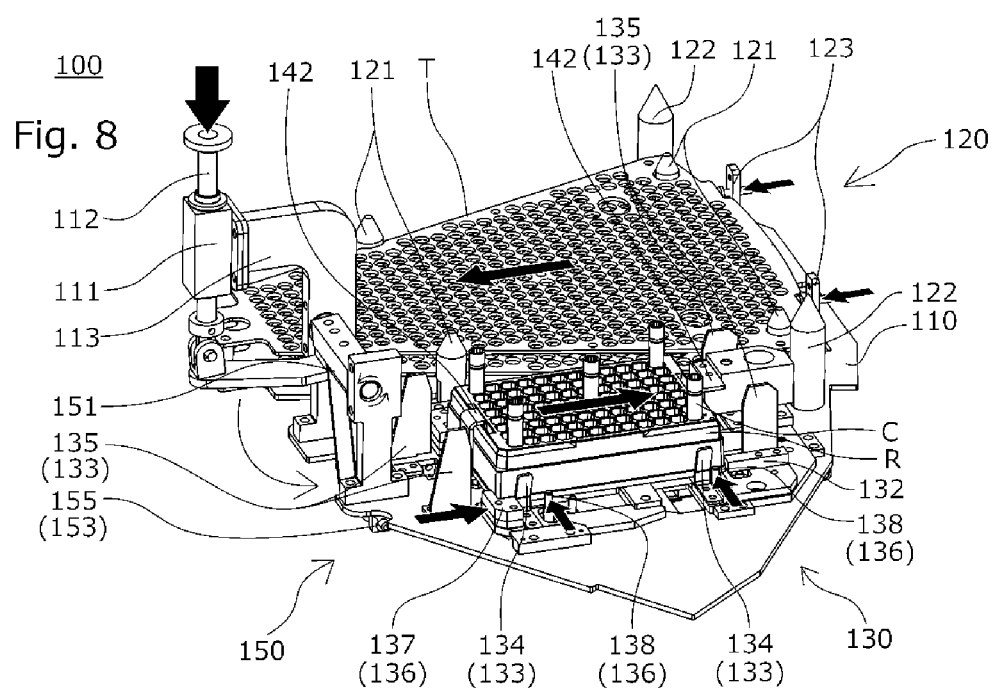
FIG. 8 is a perspective view illustrating the positioning device 100 of the low-temperature storage system according to one embodiment of the present invention with a tray T and a rack R being positioned thereon.
Figure 9:
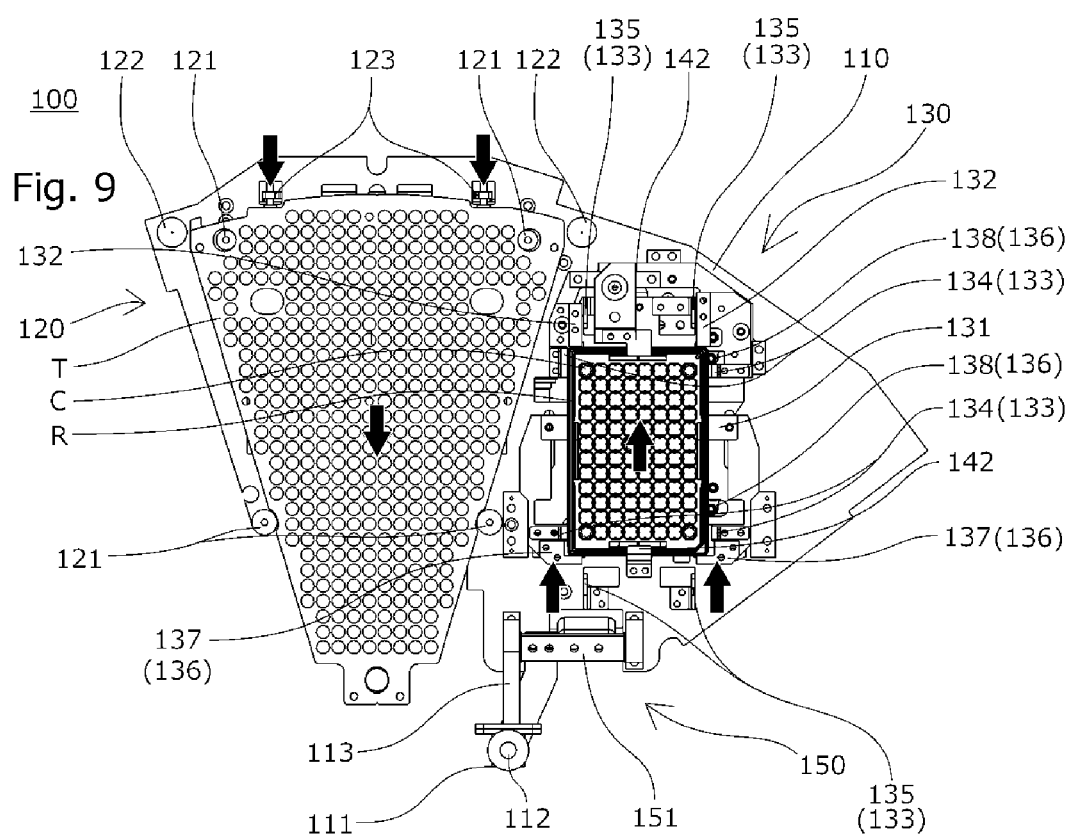
FIG. 9 is a top plan view illustrating the positioning device 100 of the low-temperature storage system according to one embodiment of the present invention with a tray T and a rack R being positioned thereon.
Figure 10:
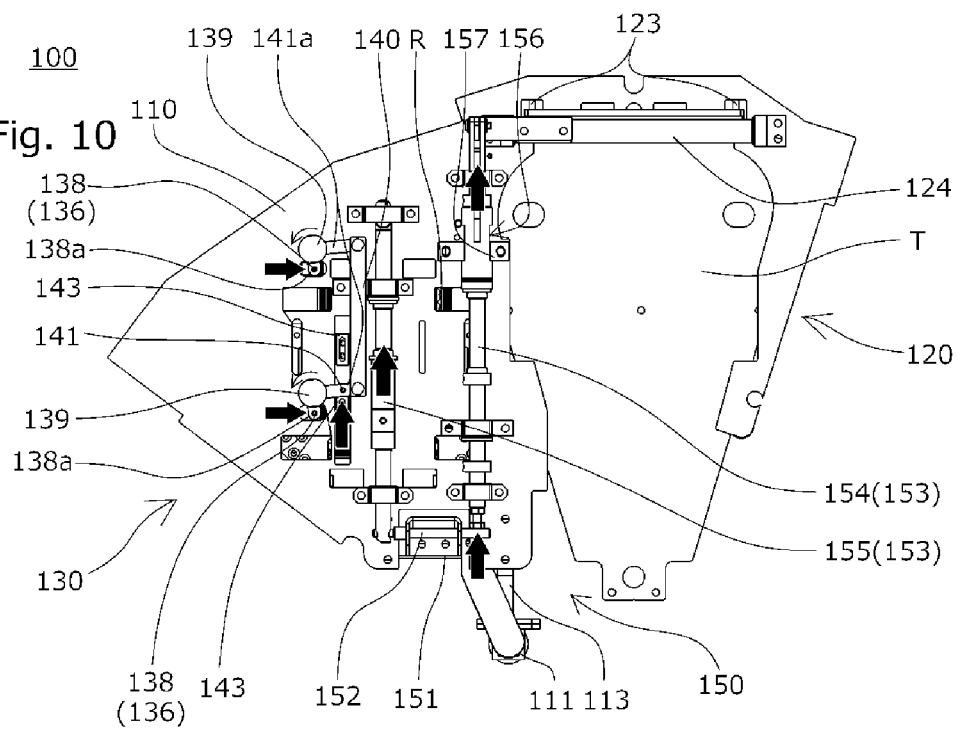
FIG. 10 is a bottom plan view illustrating the positioning device 100 of the low-temperature storage system according to one embodiment of the present invention with a tray T and a rack R being positioned thereon.
Figure 11:
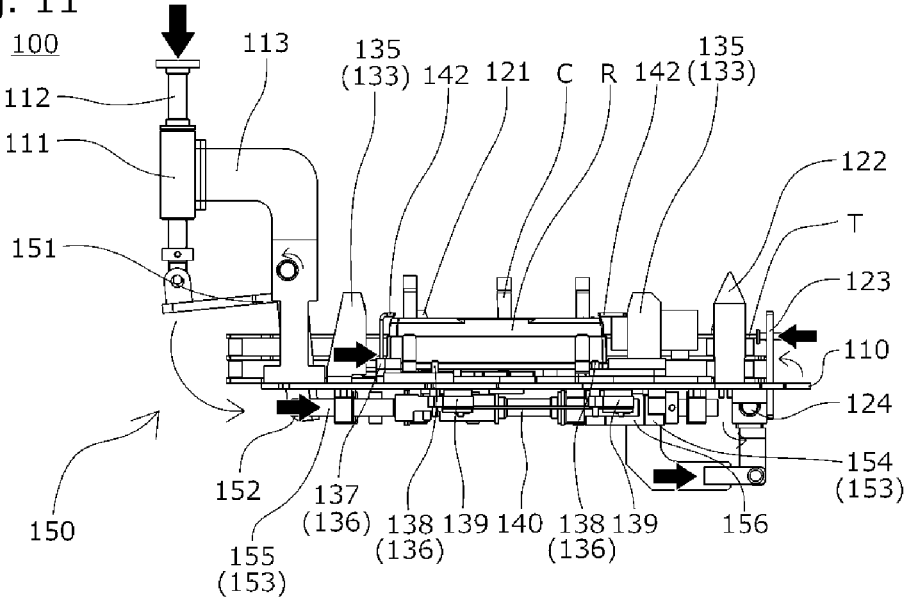
FIG. 11 is a side view illustrating the positioning device 100 of the low-temperature storage system according to one embodiment of the present invention with a tray T and a rack R being positioned thereon.

First, as shown in FIG. 5 to FIG. 7, a tray T is placed on the tray fixing unit 120, and a rack R is placed on the rack fixing unit 130.

When placing the tray T on the tray fixing unit 120, no precise alignment is necessary, since the tray motion limiting members 122 guide the tray T into a predetermined area on the tray fixing unit 120 and hold the tray T with predetermined play.

The tray T placed on the tray fixing unit 120 may shift due to vibration or impact, but a large displacement of the tray T is unlikely to occur because of the tray motion restricting members 121 and tray motion limiting members 122.

The rack motion limiting member 133 similarly holds the rack R with predetermined play so that, when placing the rack R on the rack fixing unit 130, no precise alignment is necessary, and while the rack R placed on the rack fixing unit 130 may shift due to vibration or impact, a large displacement of the rack R is unlikely to occur because of the rack motion limiting member 133.

At this time, the tray pressing member 123 and rack pressing member 136 are waiting at locations spaced away from their respective tray T or rack R pressing positions.

Next, as shown in FIG. 8 to FIG. 11, the drive shaft 112 is pressed. This pushes down one end of the power transmission lever 151 connected to the drive shaft 112, so that the rack-side linking member 155 connected to the other end of the power transmission lever 151 via the lever connecting rod 152 moves in the pressing direction.

The lever connecting rod 152 at this time comes into contact with the tray-side linking member 154 and presses it directly. Thus pressing one drive shaft 112 causes the rack-side linking member 155 and tray-side linking member 154 to move simultaneously.

The tray-side linking member 154 thus moved by the lever connecting rod 152 in the pressing direction rotates the tray-side rotating member 124 that is connected to the other end of the tray-side linking member 154.

This causes the tray pressing member 123 to make contact with the tray T and to press the tray T.

The movement adjustment stopper 157 is located within the chamfer 156, and therefore the tray-side linking member 154 moves in the pressing direction as far as to a position where an end portion of the chamfer 156 abuts against the movement adjustment stopper 157.

This prevents excessive pressing of the tray T by the tray pressing member 123 and reduces stress on the tray fixing unit 120.

The tray T moves in the direction in which it is pressed by the pressing member 123, but is restricted from moving further than the position where the tray abuts against the tray motion restricting members 121.

Since the tray motion restricting members 121 are located such as to serve as guides to direct the tray T to a specific position, the tray T being pressed by the tray pressing member 123 is reliably guided to and fixedly set at the specific position.

The rack-side linking member 155 moved by the lever connecting rod 152 in the pressing direction carries the slide plate 131 connected to the rack-side linking member 155 toward the pressing direction, with the rack R placed thereon.

While the rack R is restricted from moving further than the position where it abuts against the rack motion restricting members 132, the slide plate 131 keeps on traveling further toward the pressing direction, gliding beneath the rack R, until the short-side pressing pieces 137 contact the rack R. Thus the short-side pressing pieces 137 and the rack motion restricting members 132 hold both short sides of the rack R.

As the slide plate 131 travels in the pressing direction, the force-transmitting members 143 provided to the slide plate 131 also move in the pressing direction, pressing the force-transmitting boss 141.

The movement of the force-transmitting boss 141 translates into rotation of the rack-side rotating members 139, which causes the long-side pressing pieces 138 to contact the long side of the rack R and presses the rack R. Thus the long sides of the rack R are held from both sides by the long-side pressing pieces 138 and the long-side motion limiting parts 134 positioned opposite the long-side pressing pieces 138 across the rack R.

The rack motion restricting members 132 are fixed in position, and therefore the rack R being pushed by the short-side pressing pieces 137 is pressed against the rack motion restricting members 132.

The long-side motion limiting parts 134 opposite the long-side pressing pieces 138 across the rack R are fixed in position, so that they provide the similar function as the rack motion restricting members 132 in a direction perpendicular to the moving direction of the slide plate 131.

Namely, the rack R pushed by the long-side pressing pieces 138 in the direction perpendicular to the moving direction of the slide plate 131 is pressed against the long-side motion limiting parts 134.

This way, the rack R being pushed by the short-side pressing pieces 137 and long-side pressing pieces 138 is reliably guided to a specific position and held fixedly at this position.

When a storage object C being picked up from the rack R gets stuck on the rack R and the rack R goes up with the storage object, the elevation preventing stoppers 142, one on top of the short-side pressing piece 137 and the other opposite from the short-side pressing piece 137 across the rack R, hold down the upper surface of the rack R, so that the storage object C alone is reliably picked up from the rack R.

As described above, the tray T and rack R held in the picking area are always reliably guided to and set fixedly at specific positions. Storage objects C can be transferred in a reliably manner based only on previously stored data of fixed positions of the tray T and rack R in the picking area since precise positions of the tray T and rack R are known from the stored data and their positions need not be checked using a camera or the like during picking operations.

Equipment such as cameras are not necessary, which helps avoid increases in complexity or size of the machine structure and the cost.

Moreover, this positioning device 100 is able to fixedly set the tray T and rack R at specified positions only by an up and down movement of the drive shaft 112. Therefore, if a picking device (not shown) is configured to perform picking operations while the picking device itself pressing down the distal end of the drive shaft 112, for example, transfer of storage objects C can be carried out reliably without bringing other devices than the picking device into the low-temperature storage chamber (not shown).

Moreover, since the positioning device 100 has no power source that generates heat, a temperature rise inside the low-temperature storage chamber (not shown) can be prevented.

The linking member 153 may be initially biased toward the opposite direction from the pressing direction with a biasing member or the like, for example. The linking member 153 will then move automatically in the direction in which the power transmission lever 151 is pushed back when the drive shaft 112 is simply released from the pressure after a picking operation, whereby the tray T and rack R are freed from the pressure applied by the tray pressing member 123 and rack pressing member 136, as well as the drive shaft 112 is returned to its original position.

While one embodiment of the present invention has been described above in detail, the present invention is not limited to the embodiment described above. Various design changes may be made without departing from the scope of the claims set forth in the claims.

The drive mechanism provided in the embodiment described above includes a power transmission lever connected to the drive shaft, and a linking member made up of a tray-side linking member and a rack-side linking member respectively supplying a drive force to the tray pressing member and rack pressing member. The configuration of the drive mechanism is not limited to this example. The linking member may be omitted, for example, and the power transmission lever may be configured to transmit a drive force directly to the tray pressing member and rack pressing member. Alternatively, a power transmission lever may be provided to each of the tray-side linking member and the rack-side linking member to press them independently.

While the drive shaft may be pressed by the picking device during a picking operation as mentioned in the above embodiment, the method of pressing the drive shaft is not limited to this example. A pressing device may be provided outside the low-temperature storage chamber separately from the picking device, for example, to press the drive shaft using this pressing device from outside the low-temperature storage chamber.

While the elevation preventing stopper is provided at the midpoint of the short-side pressing piece and on the opposite short side across the rack in the above embodiment, the elevation preventing stopper need not necessarily be provided to these positions. For example, the elevation preventing stopper may be formed above the long-side motion limiting piece.

In the above embodiment, the tray-side linking member has a chamfer, with a movement adjustment stopper positioned to fit into the space made by the chamfer on the lower surface of the base plate. The drive mechanism may be configured otherwise, e.g., the chamfer and movement adjustment stopper may be omitted, or, a chamfer and a movement adjustment stopper may be provided to the rack-side linking member.

What is claimed is:

1. A low-temperature storage system comprising:
a low-temperature storage chamber,
a storage area inside the low-temperature storage chamber including a tray and a rack, where a plurality of storage objects are held on the tray and stored; and
a picking area inside the low-temperature storage chamber including a positioning device to allow storage objects to be carried in and out of the storage area,
the positioning device including a rack fixing unit for setting the rack, at a fixed position, a tray fixing unit for setting the tray at a fixed position, and a drive mechanism for driving the rack fixing unit and the tray fixing unit,
the rack fixing unit including a rack pressing member driven by the drive mechanism to press the rack in a predetermined direction, and a rack motion restricting member that restricts movements of the rack being pushed by the rack pressing member,
the tray fixing unit including a tray pressing member driven by the drive mechanism to press the tray in a predetermined direction, and a tray motion restricting member that restricts movements of the tray being pushed by the tray pressing member.

2. The low-temperature storage system according to claim 1, wherein the tray fixing unit is provided with a tray motion limiting member that holds a tray at a predetermined position while limiting motion of the tray.

3. The low-temperature storage system according to claim 1, wherein the rack fixing unit is provided with an elevation preventing stopper movable back and forth over the rack set at a fixed position on the rack fixing unit.

4. The low-temperature storage system according to claim 1, wherein the drive mechanism includes a linking member that causes the tray pressing member and the rack pressing member to move back and forth in respective pressing directions, and a power transmission lever connected to the linking member that causes the linking member to move back and forth.

5. The low-temperature storage system according to claim 4, wherein the linking member includes a tray-side linking member that causes the tray pressing member to move back and forth in a direction in which the tray is pressed, and a rack-side linking member that causes the rack pressing member to move back and forth in a direction in which the rack is pressed,
the power transmission lever including a lever connecting rod connected to one of the tray-side linking member and the rack-side linking member,
the lever connecting rod having one end extending to a position where the one end is able to make contact with one of the tray-side linking member and the rack-side linking member that is not connected to the lever connecting rod.

6. The low-temperature storage system according to claim 4, wherein the power transmission lever is configured to be operable by an external force applied from outside the low-temperature storage chamber.

7. The low-temperature storage system according to claim 4, wherein the linking member includes a biasing member biasing at least one of the tray pressing member and the rack pressing member in an opposite direction from a pressing direction.

8. The low-temperature storage system according to claim 4, wherein the rack-pressing member further includes a slide plate that is moved back and forth by the linking member in a pressing direction, and an auxiliary linking member for causing the rack to be pressed in a direction perpendicular to a direction of back and forth movements of the slide plate,
the slide plate having a downwardly protruding force-transmitting member,
the auxiliary linking member including a rack-side rotating member rotatable around a center axis, and a force-transmitting base part and a force-applying base part extending radially outward from the rack-side rotating member,
the force-transmitting base part having a distal end where an upwardly protruding force-transmitting boss is provided,
the force-applying base part having a distal end where an upwardly protruding pressing piece is provided,
the force-transmitting member being disposed such as to be able to press the force-transmitting boss.

* * * * *